(12) United States Patent
Ahrens, Jr. et al.

(10) Patent No.: US 6,792,564 B2
(45) Date of Patent: Sep. 14, 2004

(54) STANDARDIZED FORMAT FOR REPORTING ERROR EVENTS OCCURRING WITHIN LOGICALLY PARTITIONED MULTIPROCESSING SYSTEMS

(75) Inventors: George Henry Ahrens, Jr., Pflugerville, TX (US); Douglas Marvin Benignus, Dime Box, TX (US); Leo C. Mooney, Cedar Park, TX (US); Arthur James Tysor, Buda, TX (US)

(73) Assignee: International Business Machines Corporation, Armonk, NY (US)

( * ) Notice: Subject to any disclaimer, the term of this patent is extended or adjusted under 35 U.S.C. 154(b) by 544 days.

(21) Appl. No.: 09/798,184

(22) Filed: Mar. 1, 2001

(65) Prior Publication Data

US 2002/0124213 A1 Sep. 5, 2002

(51) Int. Cl.[7] .................................................. G06F 11/00
(52) U.S. Cl. .......................................... 714/45; 714/31
(58) Field of Search .............................. 714/31, 37, 45, 714/48, 57, 25, 38

(56) References Cited

U.S. PATENT DOCUMENTS

| | | | | |
|---|---|---|---|---|
| 5,021,949 A | * | 6/1991 | Morten et al. ............... | 709/231 |
| 5,335,341 A | * | 8/1994 | Chana ......................... | 714/37 |
| 5,682,470 A | * | 10/1997 | Dwork et al. ................. | 714/12 |
| 5,724,516 A | * | 3/1998 | Temoshenko ............... | 709/202 |
| 5,860,115 A | * | 1/1999 | Neuhard et al. ............ | 711/147 |
| 5,928,328 A | * | 7/1999 | Komori et al. ............. | 709/223 |
| 6,263,457 B1 | * | 7/2001 | Anderson et al. ............. | 714/38 |
| 6,601,190 B1 | * | 7/2003 | Meyer et al. ................. | 714/37 |
| 6,618,823 B1 | * | 9/2003 | West ........................... | 714/25 |
| 6,643,802 B1 | * | 11/2003 | Frost et al. ................... | 714/37 |
| 2001/0013108 A1 | * | 8/2001 | Sturm et al. ................. | 714/48 |

OTHER PUBLICATIONS

Birman et al., "Reliability Through Consistency", 1995, IEEE Software, pp. 29–41.*
Sens et al., "STAR: a Fault–Tolerant System for Distributed Applications", 1993, IEEE, pp. 656–660.*
"OGR.h", May 2, 2000, Distributed.net [http://http.distributed.net/pub/dcti/source/archives/pub–20000502.tar.gz].*

* cited by examiner

*Primary Examiner*—Robert Beausoliel
*Assistant Examiner*—Gabriel Chu
(74) *Attorney, Agent, or Firm*—Duke W. Yee; Mark E. McBurney; Lisa L. B. Yociss

(57) ABSTRACT

A method, system, and product in a computer system are described for reporting error events which occur within the computer system. The computer system includes multiple logical partitions. Each of the logical partitions includes a different one of multiple, different operating systems. A format is specified for reporting error events. An error event occurring within one of the logical partitions is detected. Information about the error event is formatted according to the specified format. Each operating system utilizes this format to report error events.

43 Claims, 5 Drawing Sheets

200 DATA PROCESSING SYSTEM

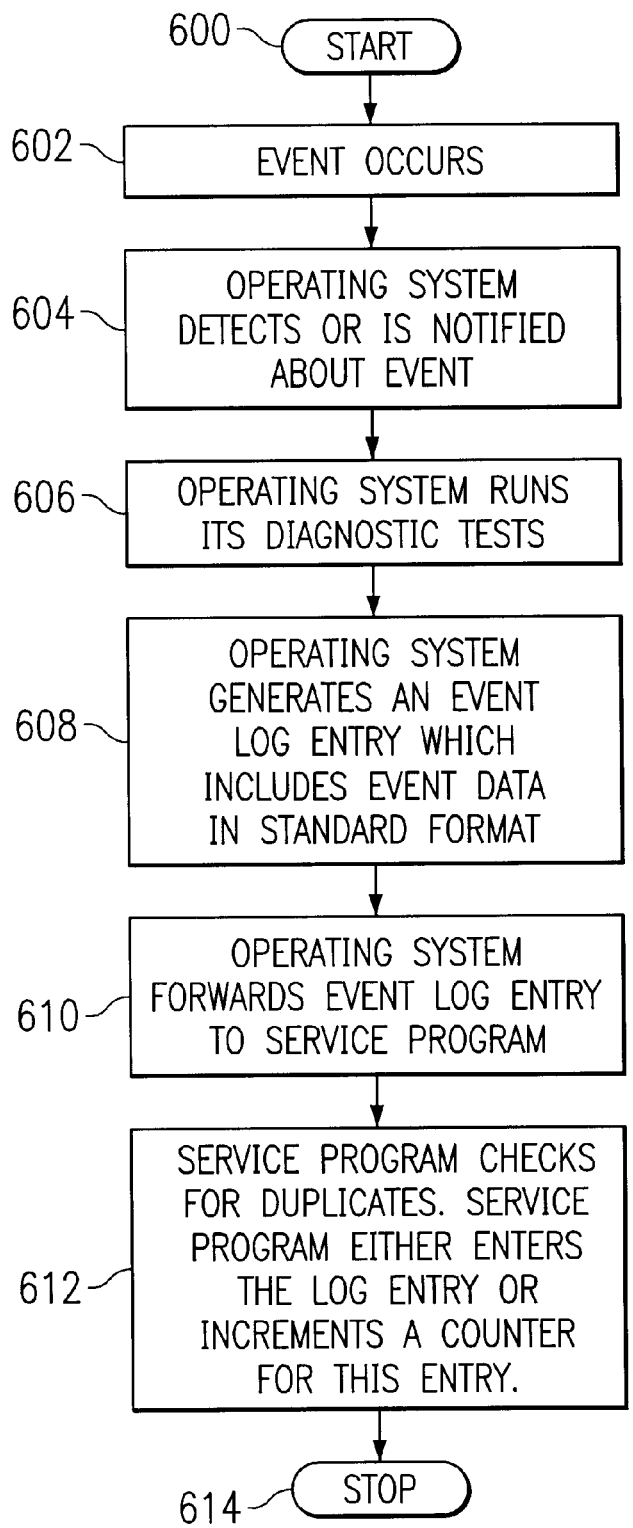

STANDARDIZED FORMAT FOR REPORTING ERROR EVENTS OCCURRING WITHIN LOGICALLY PARTITIONED MULTIPROCESSING SYSTEMS

BACKGROUND OF THE INVENTION

1. Technical Field

The present invention relates generally to data processing systems, and more particularly to logically partitioned multiprocessing systems. Still more particularly, the present invention relates to a standardized format for reporting error events which occur within multiple, different operating systems included within a logically partitioned multiprocessing system.

2. Description of Related Art

Logical partitioning is the ability to make a single multiprocessing system run as if it were two or more independent systems. Each logical partition represents a division of resources in the system and operates as an independent logical system. Each partition is logical because the division of resources may be physical or virtual. An example of logical partitions is the partitioning of a multiprocessor computer system into multiple independent servers, each with its own processors, main storage, and I/O devices. One of multiple different operating systems, such as AIX, LINUX, or others, can be running in each partition.

In a Logically Partitioned (LPAR) multiprocessing system, there are a class of errors (Local) that are only reported to the assigned or owning partition's operating system. Failures of I/O adapters which are only assigned to a single partition's operating system are an example of this. There is also another class of errors (Global) that are reported to each partition's operating system because they could potentially affect each partition's operation. Examples of this type are power supply, fan, memory, and processor failures.

When a serviceable event occurs within one of the logical partitions or is reported to the operating system in the partition, the operating system being executed by that logical partition will execute a diagnostic routine to gather information about the event.

Each operating system will likely have different diagnostic capabilities and different formats for reporting error events. In systems having logical partitioning, and thus which support different operating systems, error events will be reported in a variety of different formats. This can cause a problem for a service technician called to repair the error by creating confusion for the service technician.

Therefore, a need exists for a method, system, and product for providing a standardized format for reporting error events by any of multiple, different operating systems capable of being executed by a logically partitioned multiprocessing system.

SUMMARY OF THE INVENTION

A method, system, and product in a computer system are described for reporting error events which occur within the computer system. The computer system includes multiple logical partitions. Each of the logical partitions may include a different one of multiple, different operating systems. A format is specified for reporting error events. An error event occurring within one of the logical partitions is detected. Information about the error event is formatted according to the specified format. Each operating system utilizes this format to report error events.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 is a high level flow chart which depicts different operating systems reporting error event information in a standardized format in accordance with the present invention.

DETAILED DESCRIPTION OF THE PREFERRED EMBODIMENT

A preferred embodiment of the present invention and its advantages are better understood by referring to the figures, like numerals being used for like and corresponding parts of the accompanying figures.

The invention is preferably realized using a well-known computing platform, such as an IBM RS/6000 server running the IBM AIX operating system. However, it may be realized in other popular computer system platforms, such as an IBM personal computer running the Microsoft Windows operating system or a Sun Microsystems workstation running operating systems such as UNIX or LINUX, without departing from the spirit and scope of the invention.

The present invention is a method, system, and product which provide for a standardized format for reporting error events which occur within the computer system. The computer system includes multiple logical partitions. Each of the logical partitions may include a different one of multiple, different operating systems.

The standardized format is used by each of these different operating systems for reporting error events. In this manner, the same type of data will be reported in a consistent manner by each different operating system.

An error event log entry will be created by an operating system for each error event. Each error event log entry can include an identification of the operating system which is reporting the error, a diagnostic format, a diagnostic mode, an error code, a sequence number, an error time-stamp, descriptive text, location codes, field replaceable unit part numbers, a partition identifier, a machine type, a resource name, a host name, a date and time, a serviced flag, and operating system specific information. This information collected for each error event is described below in more detail.

Figure 1:
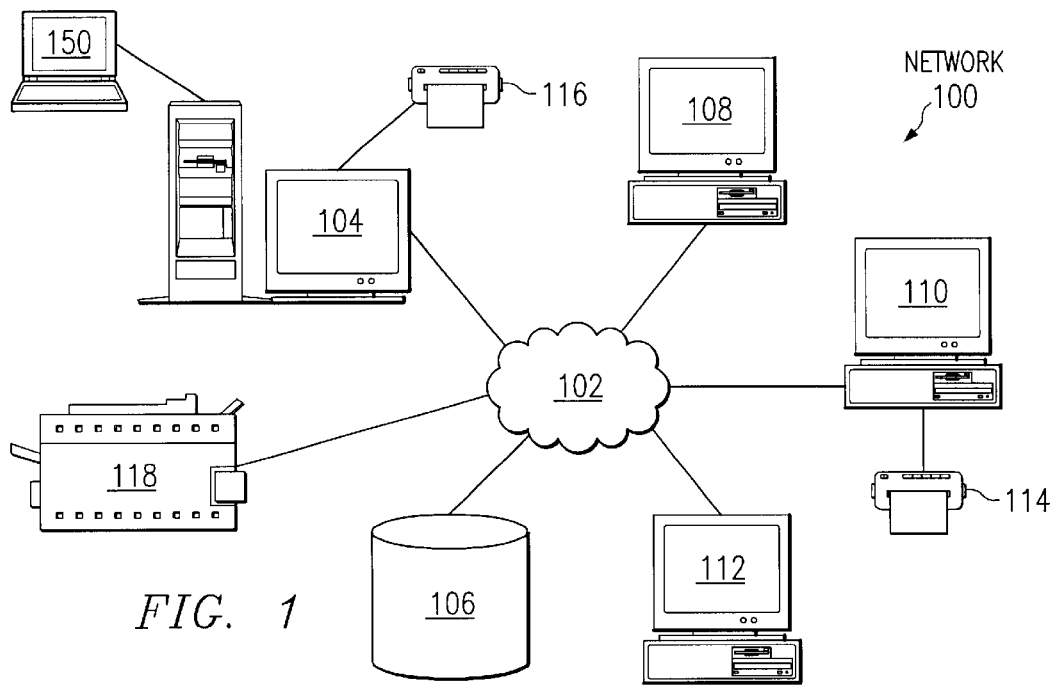
FIG. 1 depicts a pictorial representation of a distributed data processing system in which the present invention may be implemented.

With reference now to the figures, and in particular with reference to FIG. 1, a pictorial representation of a distributed data processing system is depicted in which the present invention may be implemented.

Distributed data processing system 100 is a network of computers in which the present invention may be implemented. Distributed data processing system 100 contains network 102, which is the medium used to provide communications links between various devices and computers connected within distributed data processing system 100. Network 102 may include permanent connections, such as wire or fiber optic cables, or temporary connections made through telephone connections.

In the depicted example, server 104 is connected to hardware system console 150. Server 104 is also connected to network 102, along with storage unit 106. In addition, clients 108, 110 and 112 are also connected to network 102. These clients, 108, 110 and 112, may be, for example, personal computers or network computers. For purposes of this application, a network computer is any computer coupled to a network that receives a program or other application from another computer coupled to the network. In the depicted example, server 104 is a logically partitioned platform and provides data, such as boot files, operating system images and applications, to clients 108–112. Hardware system console 150 may be a laptop computer and is used to display messages to an operator from each operating system image running on server 104, as well as to send input information received from the operator, to server 104. Clients 108, 110 and 112 are clients to server 104. Distributed data processing system 100 may include additional servers, clients, and other devices not shown. Distributed data processing system 100 also includes printers 114, 116 and 118. A client, such as client 110, may print directly to printer 114. Clients, such as client 108 and client 112, do not have directly attached printers. These clients may print to printer 116, which is attached to server 104, or to printer 118, which is a network printer that does not require connection to a computer for printing documents. Client 110, alternatively, may print to printer 116 or printer 118, depending on the printer type and the document requirements.

In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks such as, for example, an intranet or a local area network.

FIG. 1 is intended as an example and not as an architectural limitation for the processes of the present invention.

Figure 2:
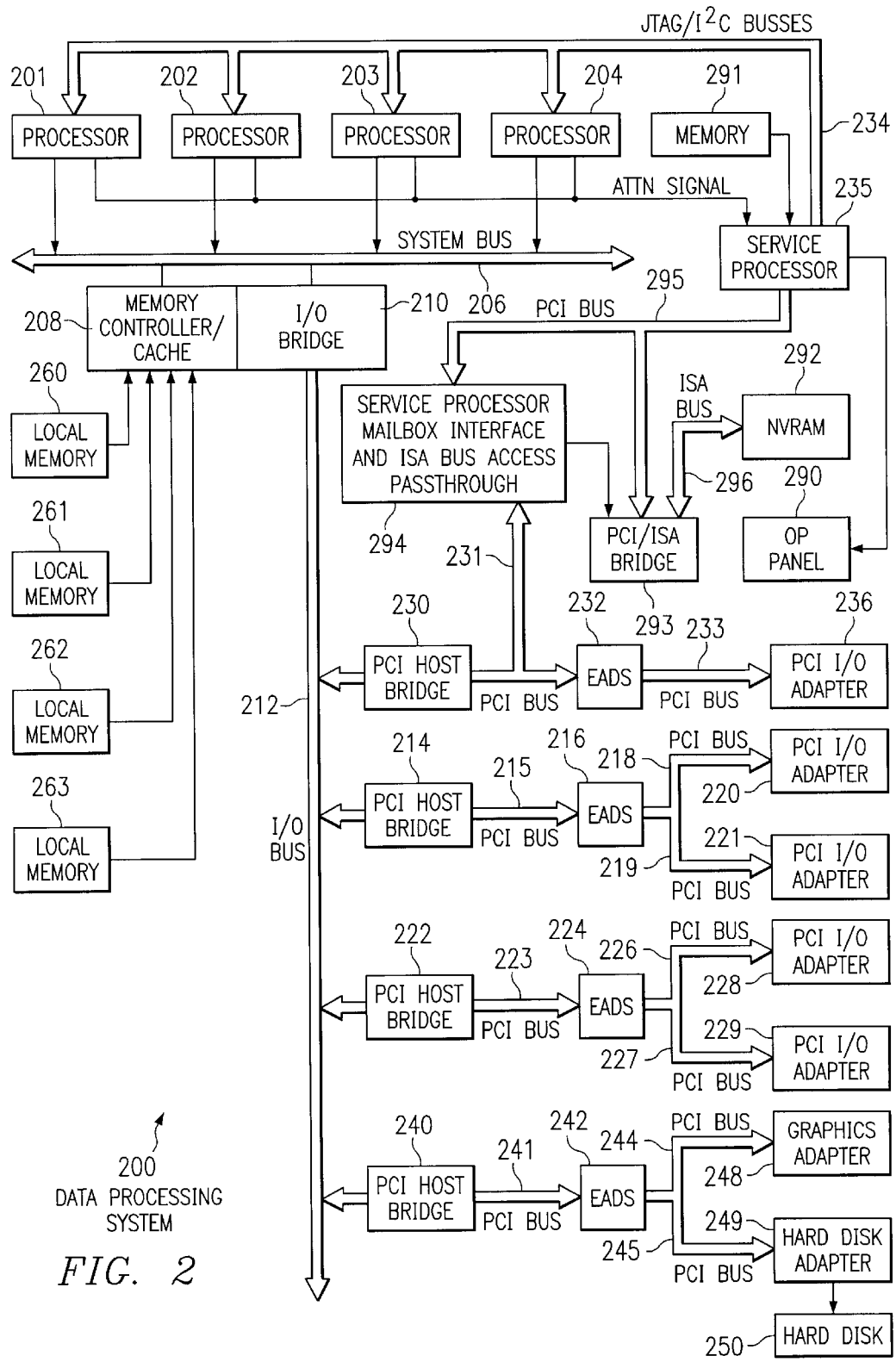
FIG. 2 depicts a block diagram of a data processing system in which the present invention may be implemented.

With reference now to FIG. 2, a block diagram of a data processing system, which may be implemented as a logically partitioned server, such as server 104 in FIG. 1, and in which the present invention may be implemented is depicted. Data processing system 200 may be a symmetric multiprocessor (SMP) system including a plurality of processors 201, 202, 203, and 204 connected to system bus 206. For example, data processing system 200 may be an IBM RS/6000, a product of International Business Machines Corporation in Armonk, N.Y., implemented as a server within a network. Alternatively, a single processor system may be employed. Also connected to system bus 206 is memory controller/cache 208, which provides an interface to a plurality of local memories 260–263. I/O bus bridge 210 is connected to system bus 206 and provides an interface to I/O bus 212. Memory controller/cache 208 and I/O bus bridge 210 may be integrated as depicted.

Data processing system 200 is a logically partitioned data processing system. Thus, data processing system 200 may have multiple heterogeneous operating systems (or multiple instances of a single operating system) running simultaneously. Each of these multiple operating systems may have any number of software programs executing within in it. Data processing system 200 is logically partitioned such that different I/O adapters 220–221, 228–229, 236, and 248–249 may be assigned to different logical partitions.

Thus, for example, suppose data processing system 200 is divided into three logical partitions, P1, P2, and P3. Each of I/O adapters 220–221, 228–229, 236 and 248–249, each of processors 201–204, and each of local memories 260–263 is assigned to one of the three partitions. For example, processor 201, memory 260, and I/O adapters 220, 228, and 229 may be assigned to logical partition P1; processors 202–203, memory 261, and I/O adapters 221 and 236 may be assigned to partition P2; and processor 204, memories 262–263, and I/O adapters 248–249 may be assigned to logical partition P3.

Each operating system executing within data processing system 200 is assigned to a different logical partition. Thus, each operating system executing within data processing system 200 may access only those I/O units that are within its logical partition. Thus, for example, one instance of the Advanced Interactive Executive (AIX) operating system may be executing within partition P1, a second instance (image) of the AIX operating system may be executing within partition P2, and a Windows 2000 operating system may be operating within logical partition P3. Windows 2000 is a product and trademark of Microsoft Corporation of Redmond, Wash.

Peripheral component interconnect (PCI) Host bridge 214 connected to I/O bus 212 provides an interface to PCI local bus 215. A number of Input/Output adapters 220–221 may be connected to PCI bus 215. Typical PCI bus implementations will support between four and eight I/O adapters (i.e. expansion slots for add-in connectors). Each I/O Adapter 220–221 provides an interface between data processing system 200 and input/output devices such as, for example, other network computers, which are clients to data processing system 200.

An additional PCI host bridge 222 provide an interface for an additional PCI bus 223. PCI bus 223 is connected to a plurality of PCI I/O adapters 228–229 by a PCI bus 226–227. Thus, additional I/O devices, such as, for example, modems or network adapters may be supported through each of PCI I/O adapters 228–229. In this manner, data processing system 200 allows connections to multiple network computers.

A memory mapped graphics adapter 248 may be connected to I/O bus 212 through PCI Host Bridge 240 and EADS 242 via PCI buses 241 and 244 as depicted. Also, a hard disk 250 may also be connected to I/O bus 212 through PCI Host Bridge 240 and EADS 242 via PCI buses 241 and 245 as depicted.

A PCI host bridge 230 provides an interface for a PCI bus 231 to connect to I/O bus 212. PCI bus 231 connects PCI host bridge 230 to the service processor mailbox interface and ISA bus access passthrough logic 294 and EADS 232. The ISA bus access passthrough logic 294 forwards PCI accesses destined to the PCI/ISA bridge 293. The NV-RAM storage is connected to the ISA bus 296. The Service processor 235 is coupled to the service processor mailbox interface 294 through its local PCI bus 295. Service processors 235 is also connected to processors 201–204 via a plurality of JTAG/I²C buses 234. JTAG/I²C buses 234 are a combination of JTAG/scan busses (see IEEE 1149.1) and Phillips I²C busses. However, alternatively, JTAG/I²C buses 234 may be replaced by only Phillips I²C busses or only JTAG/scan busses. All SP-ATTN signals of the host processors 201, 202, 203, and 204 are connected together to an interrupt input signal of the service processor. The service processor 235 has its own local memory 291, and has access to the hardware op-panel 290.

When data processing system 200 is initially powered up, service processor 235 uses the JTAG/scan buses 234 to interrogate the system (Host) processors 201–204, memory controller 208, and I/O bridge 210. At completion of this step, service processor 235 has an inventory and topology understanding of data processing system 200. Service processor 235 also executes Built-In-Self-Tests (BISTs), Basic Assurance Tests (BATs), and memory tests on all elements found by interrogating the system processors 201–204, memory controller 208, and I/O bridge 210. Any error information for failures detected during the BISTs, BATs, and memory tests are gathered and reported by service processor 235.

If a meaningful/valid configuration of system resources is still possible after taking out the elements found to be faulty during the BISTs, BATs, and memory tests, then data processing system 200 is allowed to proceed to load executable code into local (Host) memories 260–263. Service processor 235 then releases the Host processors 201–204 for execution of the code loaded into Host memory 260–263. While the Host processors 201–204 are executing code from respective operating systems within the data processing system 200, service processor 235 enters a mode of monitoring and reporting errors. The type of items monitored by service processor include, for example, the cooling fan speed and operation, thermal sensors, power supply regulators, and recoverable and non-recoverable errors reported by processors 201–204, memories 260–263, and bus-bridge controller 210.

Service processor 235 is responsible for saving and reporting error information related to all the monitored items in data processing system 200. Service processor 235 also takes action based on the type of errors and defined thresholds. For example, service processor 235 may take note of excessive recoverable errors on a processor's cache memory and decide that this is predictive of a hard failure. Based on this determination, service processor 235 may mark that resource for deconfiguration during the current running session and future Initial Program Loads (IPLs). IPLs are also sometimes referred to as a "boot" or "bootstrap".

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

Figure 3:
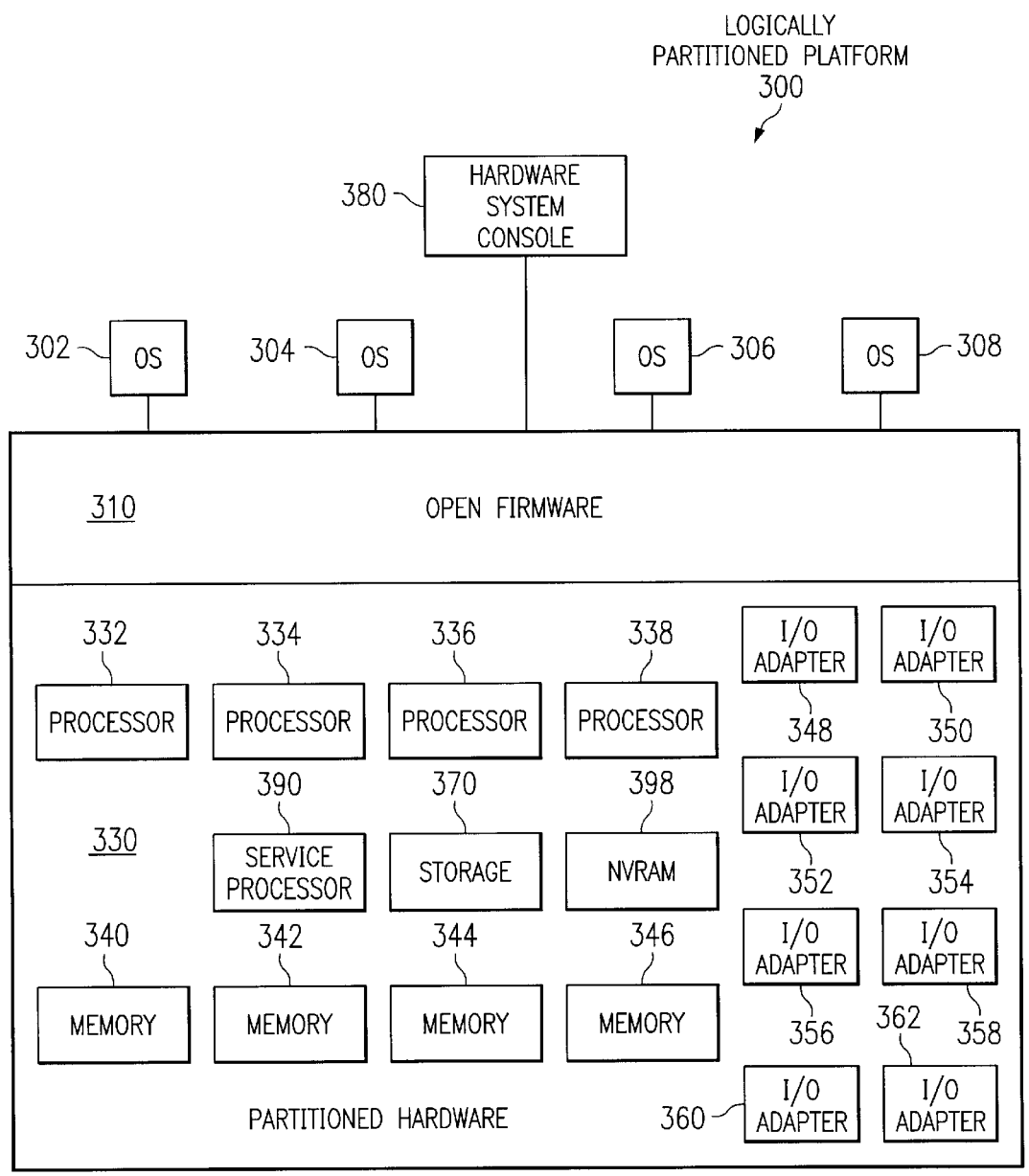
FIG. 3 depicts a block diagram of an exemplary logically partitioned platform in which the present invention may be implemented.

With reference now to FIG. 3, a block diagram of an exemplary logically partitioned platform is depicted in which the present invention may be implemented. The hardware in logically partitioned platform 300 may be implemented as, for example, server 200 in FIG. 2. Logically partitioned platform 300 includes partitioned hardware 330, Open Firmware 310, and operating systems 302–308. Operating systems 302–308 may be multiple copies of a single operating system or multiple heterogeneous operating systems simultaneously run on platform 300.

Partitioned hardware 330 includes a plurality of processors 332–338, a plurality of system memory units 340–346, a plurality of input/output (I/O) adapters 348–362, and a storage unit 370. Each of the processors 342–348, memory units 340–346, and I/O adapters 348–362 may be assigned to one of multiple partitions within logically partitioned platform 300, each of which corresponds to one of operating systems 302–308. NV-RAM is divided between each of the partitions; it is not assigned to any one specific partition.

Open Firmware 310 performs a number of functions and services for operating system images 302–308 to create and enforce the partitioning of logically partitioned platform 300. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (non-volatile RAM).

Open Firmware 310 provides the OS images 302–308 running in multiple logical partitions each a virtual copy of a console and operator panel. The interface to the console is changed from an asynchronous teletype port device driver, as in the prior art, to a set of Open Firmware calls that emulate a port device driver. The Open Firmware 310 encapsulates the data from the various OS images onto a message stream that is transferred to a computer 380, known as a hardware system console.

Open Firmware 310 includes system boot firmware. A mechanism built into each of processors 332–338 as an architected instruction allows system firmware 310 to execute at any time. Thus, system checkpoints may be immediately displayed to the operator panel window on hardware system console 380 and also immediately logged to non-volatile random access memory (NV-RAM) even before the I/O path to these devices has been configured to accept any programmed input/output (PIO) accesses.

Hardware system console 380 is connected directly to logically partitioned platform 300 as illustrated in FIG. 3, or may be connected to logically partitioned platform through a network, such as, for example, network 102 in FIG. 1. Hardware system console 380 may be, for example, a desktop or laptop computer. Hardware system console 380 decodes the message stream and displays the information from the various OS images 302–308 in separate windows, at least one per OS image. Similarly, keyboard input information from the operator is packaged by the hardware system console, sent to logically partitioned platform 300 where it is decoded and delivered to the appropriate OS image via the Open Firmware 310 emulated port device driver associated with the then active window on the hardware system console 380.

Figure 4:
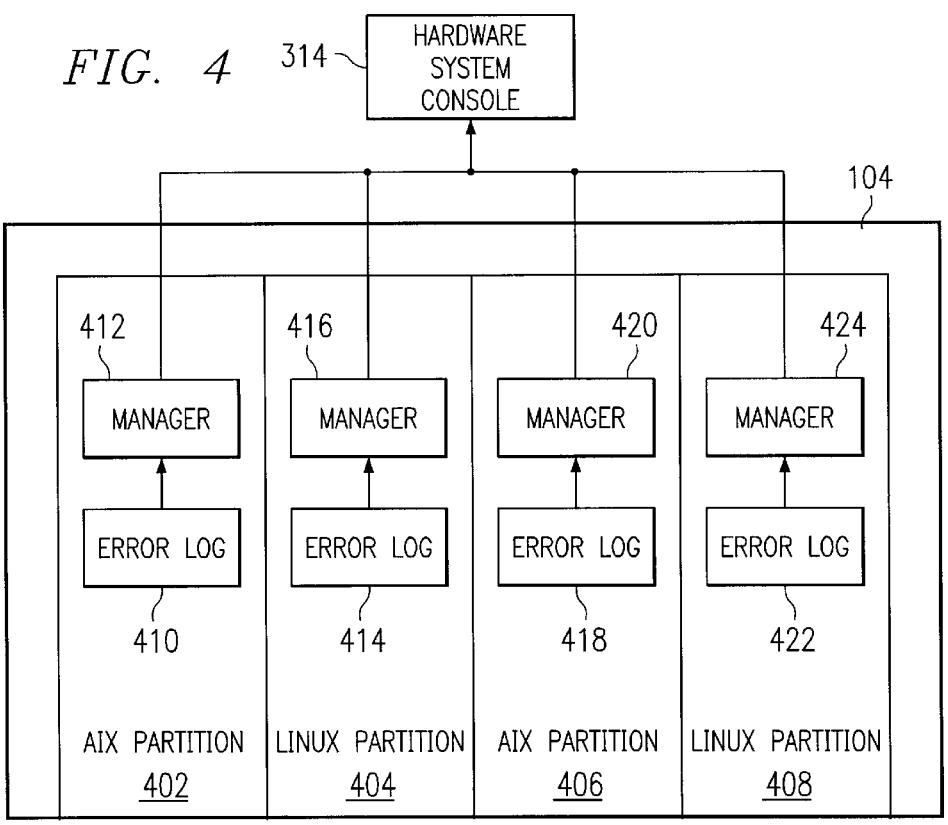
FIG. 4 is a block diagram of the logically partitioned multiprocessing server computer system of FIGS. 1 and 2 and a hardware system console in accordance with the present invention.

FIG. 4 is a block diagram of the logically partitioned multiprocessing server computer system of FIGS. 1 and 2 and a hardware system console in accordance with the present invention.

Server 104 includes a plurality of operating system (OS) partitions 402, 404, 406, and 408. These partitions receive inputs from input/output (I/O) devices, and from base hardware, which may be a power supply, a cooling supply, a fan, memory, and processors. Any one of multiple, different operating systems, such as AIX or LINUX, can be running in any partition. For example, AIX is shown in partitions 402 and 406, while LINUX is shown in partitions 404 and 408. Although four operating system partitions are shown, any number of partitions with any one of a variety of different operating systems may be utilized.

Each partition includes an error log and a manager. When an error occurs within a partition, the error is logged into the partition's error log. The manager formats error information into the standard format and forwards the error information in the form of an error event log entry to hardware system console 380. For example, partition 402 includes error log 410 and manager 412; partition 404 includes error log 414 and manager 416; partition 406 includes error log 418 and manager 420; and partition 408 includes error log 422 and manager 424.

Figure 5:
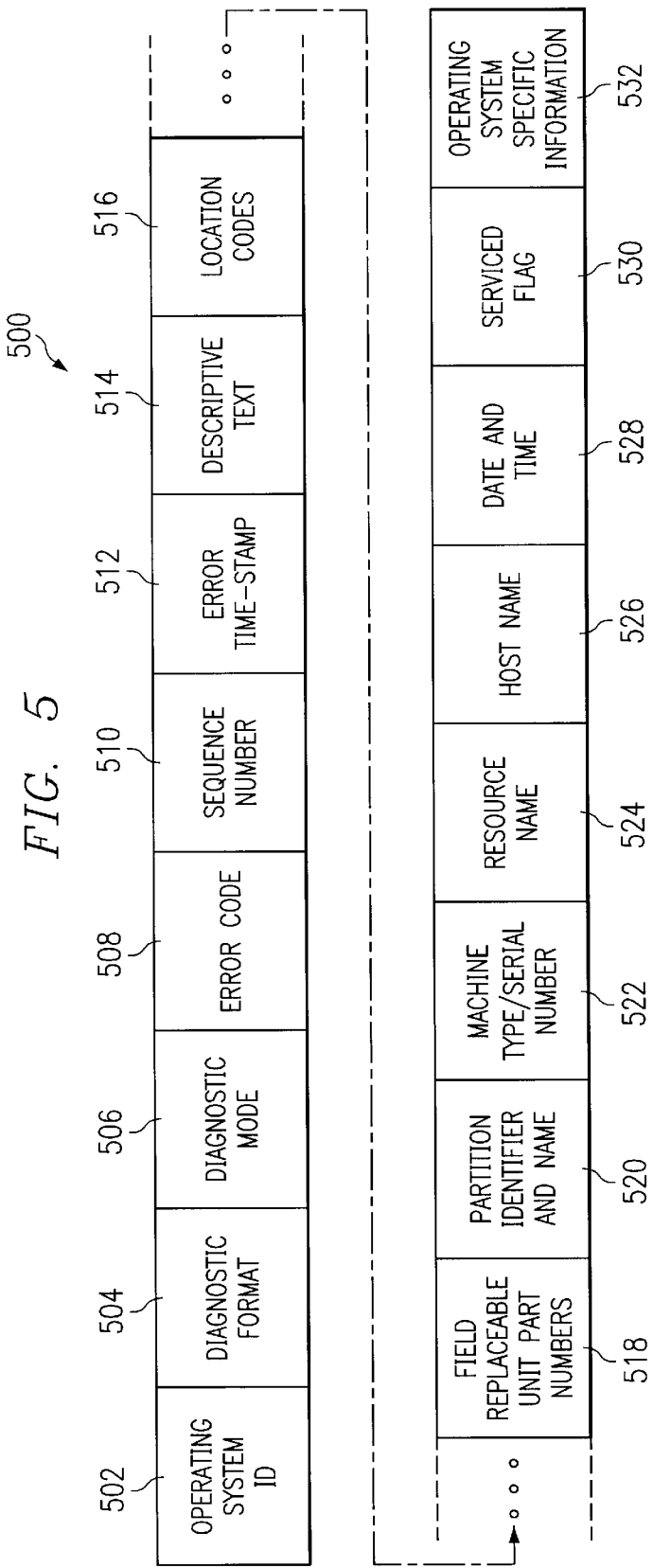
FIG. 5 is a block diagram which illustrates a standardized format which may be used by different operating systems to report error events according to the present invention.

FIG. 5 is a block diagram which illustrates a standardized format 500 which may be used by different operating systems to report error events according to the present invention. Format 500 includes a plurality of fields 502–532. Field 502 is an operating system identifier field for identifying which operating system is being executed by the logical partition and reporting the error. Field 504 is a diagnostic format field for identifying the type of diagnostic routine executed by the operating system. Field 506 is a diagnostic mode field indicates whether the operating system was up and running customer applications when the error occurred by indicating "concurrent", or whether it was unavailable for users at the time by indicating "service". Field 508 is an error code field which indicates the particular error code determined when the operating system executed the diagnostic routine. The error code identifies the failing field replaceable unit (FRU). Field 510 is a sequence number field for indicating whether the error information was obtained from an error log. Field 512 is an error time-stamp field which indicates the time and date the error occurred. Field 514 is a descriptive text field for storing a textual description. Field 516 is a location codes field for indicating the physical location of the failing FRU. Field 518 is a field replaceable unit part number field for storing the part numbers and/or serial numbers of the particular unit within the computer system which should be replaced. Field 520 is a partition identifier and name field for identifying the partition. Field 522 is a machinetype/Model/serial number field for storing the machine type and model and/or serial number of the computer system which includes the partition which generated the error event. Field 524 is a resource name field for indicating the resource name used to identify the failing device. Examples of resource names includes "fan0", "processor2", and other common names. Field 526 is a host name field for identifying the host name of the computer system. Field 528 is a date and time field which indicates the time and date the error was logged within the computer system. Field 530 is a serviced flag field for identifying whether this error event has been serviced. And, field 532 is an operating system specific information field for storing any additional operating system specific information.

FIG. 6 is a high level flow chart which depicts different operating systems reporting error event information in a standardized format in accordance with the present invention. The process starts as illustrated by block 600 and thereafter passes to block 602 which depicts an error event occurring within one of the logical partitions. Next, block 604 illustrates the operating system which is being executed from the logical partition detecting or being notified about the error event. Thereafter, block 606 depicts the operating system running its diagnostic tests to evaluate the error event. The process then passes to block 608 which illustrates the operating system generating an event log entry which includes the event data arranged in the standardized format.

Next, block 610 depicts the operating system forwarding the event log entry to the service program. Block 612, then, illustrates the service program determining whether an event log entry has already been logged for this particular error event. If an event log entry has already been logged, a counter is incremented to indicate the number of times an error log entry is received for this particular error event. If no error event log entry has already been logged, this event log entry will be logged. The process then terminates as depicted by block 614.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a computer system for reporting error events which occur within said computer system, said computer system including a plurality of logical partitions, each of said plurality of logical partitions executing a different one of a plurality of operating systems, said method comprising the steps of:

specifying a format for reporting error events;

detecting, by one of said plurality of operating systems, an error event occurring within one of said plurality of logical partitions within which said one of said plurality of operating systems is executing;

generating, by said one of said plurality of operating systems, an event log entry that includes information about said error event; and formatting said information within said event log entry using said format, said format being utilized by each of said plurality of different operating systems for arranging error information within event log entries to report error events, said format being utilized by each one of said plurality of logical partitions regardless of which one of said plurality, of operating systems is being executed by said one of said plurality of logical partitions.

2. The method according to claim 1, wherein said step of detecting an error event further comprises the step of detecting a hardware error event.

3. The method according to claim 1, further comprising the step of specifying an operating system identification field in said format for identifying an operating system included within one of said plurality of logical partitions within which said error event occurred.

4. The method according to claim 1, further comprising the step of specifying a diagnostic format field in said format for identifying a diagnostic format used by an operating system included within one of said plurality of logical partitions within which said error event occurred to analyze said error event.

5. The method according to claim 1, further comprising the step of specifying an error code field in said format for identifying an error code which describes said error event.

6. The method according to claim 1, further comprising the step of specifying a unit identifier field in said format for identifying a unit within which said error event occurred.

7. The method according to claim 1, further comprising the step of specifying a machine type/model/serial number field in said format for identifying said computer system.

8. The method according to claim 1, further comprising the step of specifying an error time-stamp field in said format for identifying a date and a time when said error event occurred.

9. The method according to claim 1, further comprising the step of reporting said error event by transmitting said event log entry to a service program which logs said event log entry.

10. The method according to claim 9, further comprising the steps of:
   determining, by said service program, whether a previous event log entry has already been stored for said error event;
   in response to a determination that said previous event log entry has already been stored for said error event, incrementing, by said service program, a counter without logging said event log entry; and
   in response to a determination that said previous event log entry has not already been stored for said error event, logging said event log entry.

11. The method according to claim 10, further comprising the step of specifying a log time-stamp field in said format for identifying a date and a time when said event log entry was logged in said computer system.

12. A method for reporting service events which occur in one of a plurality of different computer systems, said method comprising the steps of:
   specifying a format for reporting error information;
   detecting an error event occurring within one of said plurality of different computer systems, each of said plurality of different computer systems executing one of a plurality of different operating systems;
   generating, by one of said plurality of operating systems that is executing within said one of said plurality of computer systems, an event log entry that includes information about said error event;
   formatting said information within said event log entry using said format, said format being utilized by each of said plurality of different operating systems for arranging error information within event log entries to report service events, said format being utilized by each one of said plurality of computer systems regardless of which one of said plurality of operating systems is being executed by said one of said plurality of computer systems;
   determining whether a previous event log entry has already been stored for said error event;
   in response to a determination that said previous event log entry has already been stored for said error event, incrementing a counter without logging said event log entry; and
   in response to a determination that said previous event log entry has not already been stored for said error event, logging said event log entry.

13. The method according to claim 12, wherein said step of detecting an error event further comprises the step of detecting a hardware error event.

14. The method according to claim 12, further comprising the stop of specifying an operating system identification field in said format for identifying an operating system being executed by one of said plurality of computer systems within which said error event occurred.

15. The method according to claim 12, further comprising the step of specifying a diagnostic format field in said format for identifying a diagnostic format used by an operating system being executed by one of said plurality of computer systems within which said error event occurred to analyze said error event.

16. The method according to claim 12, further comprising the step of specifying an error code field in said format for identifying an error code which describes said error event.

17. The method according to claim 12, further comprising the step of specifying a unit identifier field in said format for identifying a unit within which said error event occurred.

18. The method according to claim 12, further comprising the step of specifying a machine model/type/serial number field in said format for identifying said one of said plurality of different computer systems within which said error event occurred.

19. The method according to claim 12, further comprising the step of specifying an error time-stamp field in said format for identifying a date and a time when said error event occurred.

20. The method according to claim 12, further comprising the step of reporting said error event utilizing said format.

21. The method according to claim 12, further comprising the step of specifying a log time-stamp field in said format for identifying a date and a time when said event log entry was logged within said one of said plurality of computer systems.

22. A computer program product in a computer system for reporting error events which occur within said computer system, said computer system including a plurality of logical partitions, each of said plurality of logical partitions executing a different one of a plurality of operating systems, said product comprising:
   instruction means for specifying a format for reporting error events;
   instruction means for detecting, by one of said plurality of operating systems, an error event occurring within one of said plurality of logical partitions within which said one of said plurality of operating systems is executing;
   instruction means for generating, by said one of said plurality of operating systems, an event log entry that includes information about said error event; and
   instruction means for formatting said information within said event log entry using said format, said format being utilized by each of said plurality of different operating systems for arranging error information within event log entries to report error events, said format being utilized by each one of said plurality of logical partitions regardless of which one of said plurality of operating systems is being executed by said one of said plurality of logical partitions.

23. The product according to claim 22, wherein said instruction means for detecting an error event further comprises instruction means for detecting a hardware error event.

24. The product according to claim 22, further comprising instruction means for specifying an operating system identification field in said format for identifying an operating system included within one of said plurality of logical partitions within which said error event occurred.

25. The product according to claim 22, further comprising instruction means for specifying a diagnostic format field in said format for identifying a diagnostic format used by an operating system included within one of said plurality of logical partitions within which said error event occurred to analyze said error event.

26. The product according to claim 22, further comprising instruction means for specifying an error code field in said format for identifying an error code which describes said error event.

27. The product according to claim 22, further comprising instruction means for specifying a unit identifier field in said format for identifying a unit within which said error event occurred.

28. The product according to claim 22, further comprising instruction means for specifying a machine type/model/serial number field in said format for identifying said computer system.

29. The product according to claim 22, further comprising instruction means for specifying an error time-stamp field in said format for identifying a date and a time when said error event occurred.

30. The product according to claim 22, further comprising instruction means for reporting said error event by transmitting said event log entry to a service program which logs said event log entry.

31. The product according to claim 30, further comprising:
instruction means for determining, by said service program, whether a previous event log entry has already been stored for said error event;
in response to a determination that said previous event log entry has already been stored for said error event, instruction means for incrementing, by said service program, a counter without logging said event log entry; and
in response to a determination that said previous event log entry has not already been stored for said error event, instruction means for logging, by said service program, said event log entry.

32. The product according to claim 31, further comprising instruction means for specifying a log time-stamp field in said format for identifying a date and a time when said event log entry was logged in said computer system.

33. A computer system for reporting error events which occur within said computer system, said computer system including a plurality of logical partitions, each of said plurality of logical partitions executing a different one of a plurality of operating systems, comprising:

a format for reporting error events;
said one of said plurality of operating systems detecting an error event occurring within one of said plurality of logical partitions within which said one of said plurality of operating systems is executing;
said one of said plurality of operating systems generating an event log entry that includes information about said error event; and
said computer system for formatting said information within said event log entry using said format, said format being utilized by each of said plurality of different operating systems for arranging error information within event log entries to report error events, said format being utilized by each one of said plurality of logical partitions regardless of which one of said plurality of operating systems is being executed by said one of said plurality of logical partitions.

34. The system according to claim 33, further comprising said computer system for detecting a hardware error event.

35. The system according to claim 33, further comprising operating system identification field being specified in said format for identifying an operating system included within one of said plurality of logical partitions within which said error event occurred.

36. The system according to claim 33, further comprising a diagnostic format field being specified in said format for identifying a diagnostic format used by an operating system included within one of said plurality of logical partitions within which said error event occurred to analyze said error event.

37. The system according to claim 33, further comprising an error code field being specified in said format for identifying an error code which describes said error event.

38. The system according to claim 33, further comprising a unit identifier field being specified in said format for identifying a unit within which said error event occurred.

39. The system according to claim 33, further comprising a machine type/model/serial number field being specified in said format for identifying said computer system.

40. The system according to claim 33, further comprising an error time-stamp field being specified in said format for identifying a date and a time when said error event occurred.

41. The system according to claim 33, further comprising means for reporting said error event by transmitting said event log entry to a service program which logs said event log entry.

42. The system according to claim 41, further comprising:
said service program determining whether a previous event log entry has already been stored for said error event;
in response to a determination that said previous event log entry bus already been stored for said error event, said service program incrementing a counter without togging said event log entry; and
in response to a determination that said previous event log entry has not already been stored for said error event, said service program logging said event log entry.

43. The system according to claim 42, further comprising a log time-stamp field being specified in said format for identifying a date and a time when said event log entry was tagged in said computer system.

* * * * *

UNITED STATES PATENT AND TRADEMARK OFFICE
CERTIFICATE OF CORRECTION

PATENT NO. : 6,792,564 B2
DATED : September 14, 2004
INVENTOR(S) : Ahrens, Jr. et al.

It is certified that error appears in the above-identified patent and that said Letters Patent is hereby corrected as shown below:

Column 10,
Line 16, after "the" delete "stop" and insert -- step --.

Column 12,
Line 52, after "entry" delete "bus" and insert -- has --.
Lines 53-54, after "without" delete "togging" and insert -- logging --.
Line 61, before "in said" delete "tagged" and insert -- logged --.

Signed and Sealed this

Twenty-seventh Day of December, 2005

JON W. DUDAS
*Director of the United States Patent and Trademark Office*